Patented June 27, 1939

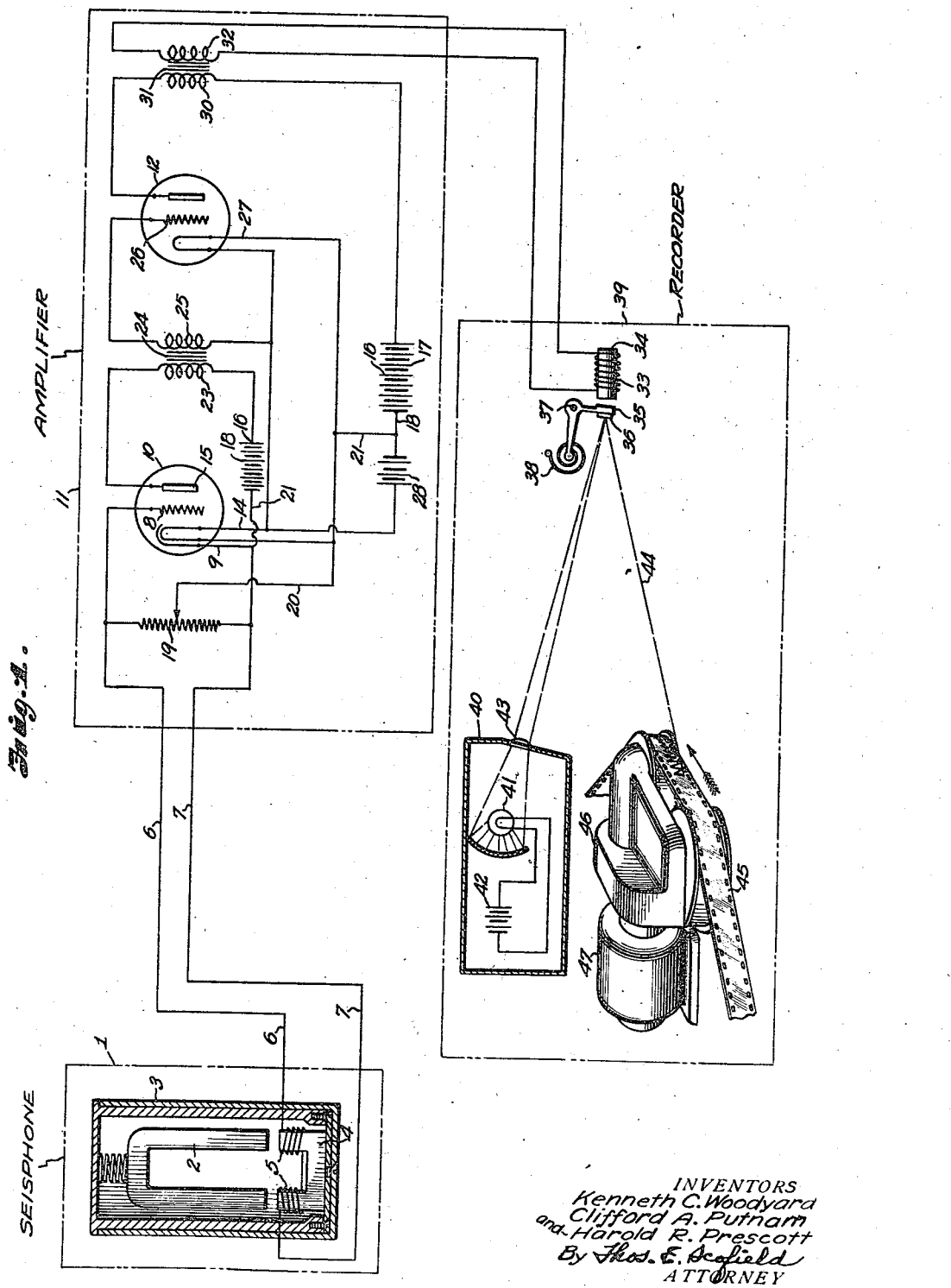

2,164,196

UNITED STATES PATENT OFFICE 2,164,196

MEANS AND METHOD OF MAKING GEOPHYSICAL EXPLORATIONS

Kenneth C. Woodyard, Welsh, La., Clifford A. Putnam, Kountze, Tex., and Harold R. Prescott, Ponca City, Okla., assignors to Continental Oil Company, Ponca City, Okla., a corporation of Delaware Application March 31, 1934, Serial No. 718,386

6 Claims. (Cl. 177—352)

Our invention relates to a means and method of making geophysical explorations, and more particularly to a means and method of eliminating the effect of extraneous electrical disturbances in seismic electrical recording apparatus for making geophysical explorations.

One method of exploring subsurface formations consists in creating earth vibrations by means of detonating a charge of explosive or the like and recording the vibrations on suitable electrical apparatus. A seismophone, which is a form of microphone, picks up the earth vibrations and delivers them to an amplifying device, the output of which is used to operate a recording device, usually a photographic one. The conductors connecting the seismophone and the amplifier are usually of the same length and wound together into a cable. When these conductors are near transmission lines, telegraph or telephone lines, or other sources of electrical energy, troublesome and undesirable voltages are induced in the conductors. Likewise, the motion of the conductors through the earth's magnetic field, due to their movement as a result of earth vibrations, induces voltages in the conductors, which voltages interfere with the making of the exploration, as the results are obscured.

One object of our invention is to provide a method of making geophysical explorations in which the effect of extraneous voltages induced in the conductors connecting the seismophone to the amplifier are annulled.

Another object of our invention is to provide a means for eliminating the effect of undesirable extraneous voltages induced in the conductors connecting the seismophone and the amplifier.

Further and other objects of our invention will appear from the following description.

The accompanying drawing shows a schematic view of one device capable of carrying out the method of our invention and embodying the apparatus of our invention.

In general, our invention contemplates equalizing the impedances of the respective conductors leading from the seismophone to the grid and to the cathode, so that the extraneous voltages induced in the conductors will be of the same amplitude and in the same phase.

More particularly referring now to the drawing, a seismophone 1 may consist of a resiliently suspended magnet 2 provided with a housing or frame 3, to which is secured armature 4, upon which are wound coils 5, connected to conductors 6 and 7. Conductors 6 and 7 lead to the grid 8 and cathode 9 of an indirectly heated cathode thermionic tube 10. The conductors 6 and 7 may be of appreciable length inasmuch as the amplifier unit may be at some distance from the seismophone 1. The amplifier unit 11 may consist of the first thermionic tube 10 and a number of further amplifying tubes 12. Only one has been shown in the drawing for purposes of simplicity though it is to be understood that any number of amplifying stages may be used as desired. The filament 14 of the tube 10 supplies heat to the cathode 9 so that it acts as an electron emission source. The plate 15 of the tube 10 is connected to a positive terminal 16 of a plate battery 18. Current flows from the plate to the cathode. When the grid potential of the tube changes with respect to the cathode, a variation in plate current will occur. This is well known to those skilled in the art. If both the cathode and the grid were changed in potential the same amount with respect to the negative terminal of the plate battery 18, no substantial change in plate current will take place. Due to the fact that the capacity to ground for the grid of the tube is less than the capacity to ground of the cathode if equal voltages were imposed upon conductors 6 and 7 in the arrangement shown, a variation in plate current would take place were it not for the balancer circuit of our invention. The balancer circuit consists of an impedance (shown as resistance 19) which is connected across the conductors 6 and 7 and connects the cathode 9 and the grid 8. A definite potential is impressed upon the cathode 9 and the grid 8 by means of conductor 20, which is connected to the negative terminal of plate battery 17 by means of conductor 21. The conductor 20 terminates at an intermediate point in the resistance 19 so that the potential change of the grid caused by extraneous voltages is exactly equal to the potential changes of the cathode caused by the same extraneous voltages. The balancer is operated by experimentally adjusting for minimum disturbance by setting the arm at some point slightly different than the mid point to compensate for the difference between the impedance of the grid with respect to the earth and the cathode impedance with respect to the earth. In effect the impedance of conductors 6 and 7 are able to be equalized by adjusting the point of contact of conductor 20 to resistance 19.

The plate circuit of tube 10 has interposed therein the primary coil 23 of the transformer 24. The secondary coil 25 of the transformer 24 is connected to grid 26 of tube 12. Filament 27 of tube 12 is heated from filament battery 28.

The plate circuit of tube 12 has interposed therein the primary 30 of transformer 31. The secondary 32 of transformer 31 is connected across a coil 33 which is provided with a core 34. A pivoted armature 35 carries a mirror 36. The armature 35 is pivoted at 37 and is provided with a spring 38 which may be a hair spring or the like. The armature and its associated actuating magnet are housed in recorder housing 39. Within the recorder housing 39 is positioned a secondary housing 40 containing an incandescent light 41 which is connected to a battery 42.

One wall of the housing 40 is provided with a lens 43 adapted to focus rays of light upon the mirror 36. The reflected beam 44 from the mirror 36 falls upon a photographic film 45 which is moved by suitable actuating mechanism 46 driven by a motor 47 at a uniform speed.

In operation, a charge of explosive is detonated. This produces earth vibrations, which vibrations are picked up by the frame 3 of the seismophone. The magnet 2, due to its inertia, tends to remain stationary in space while the armature moves relative thereto. Inasmuch as core 4 is rigidly secured to the frame 3, a relative movement between the magnet 2 and the core 4 will take place. The magnetic changes produced will induce voltages in coils 5 which are led by conductors 6 and 7 to the grid and cathode of tube 10. It will be noted that the arrangement is such that when conductor 6 is positive, conductor 7 will be negative, due to the voltages induced in the coils 5. This will produce a change in the relative potential between grid and cathode, causing a corresponding fluctuation in the plate current, as is well known in the art.

Conductors 6 and 7 are in the same cable and are closely associated thereby in a substantial fixed spatial relationship. Due to the fact that the conductors are so closely placed, the same voltage will be induced in conductor 6 as in conductor 7 by an external magnetic field or by the movement of the conductors through the earth's magnetic field. In other words, like voltages will be induced in conductors 6 and 7 at any one instant by reason of extraneous electrical disturbances.

The use of a balancer circuit enables us to cause these voltages to be exactly equal. The point of contact of balancer arm 20 may be adjusted to such a point on resistance 19 that when the undesirable extraneous voltages are introduced to grid 8 and cathode 9, the cathode and the grid will be affected to substantially the same extent so that these voltages being of the same sign and in phase, will annul each other so that no change in the plate current due to these voltages will occur. The plate current therefore will be affected only by the changes in voltages caused by the earth vibrations as they are picked up by the seismophone. This plate current is amplified and armature 35 will move in phase with the plate current changes, causing the beam 44 to rise and fall in sympathy with the earth vibrations so that the photograph record upon film 45 will be a true picture of what is happening at the seismophone, uninfluenced by extraneous voltages which may be induced in conductors 6 and 7.

By means of our method and apparatus, we have been able to carry on geophysical explorations near transmission lines and electrical equipment. Such explorations would be impossible without the use of our method and apparatus.

It will be seen, therefore, that we have accomplished the objects of our invention.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. For example, a variable impedance may be employed for resistance 19. A capacity or an inductance may be used to balance the inductance of the line, without departing from the scope of our invention. It is, therefore, to be understood that our invention is not to be limited to the specific details shown and described.

Having thus described our invention, what we claim is:

1. In an apparatus for making geophysical explorations, a seismophone, a thermionic tube having a grid and a cathode, a conductor connecting said grid and said seismophone, a conductor connecting said cathode and said seismophone, and means for equalizing the impedance of said conductors.

2. In an apparatus for making geophysical explorations, a seismophone, a thermionic tube having a grid and an indirectly heated cathode, a conductor connecting said seismophone and said grid, a conductor connecting said seismophone and said cathode and means for equalizing the impedance of said conductors whereby voltages induced in said conductors by an extraneous magnetic field will be of substantially the same amplitude and phase.

3. In an apparatus for making geophysical explorations, a thermionic tube having a grid and a cathode, a resistance connecting the grid and cathode and means for impressing a negative potential at an intermediate point in said resistance the construction being such that the effect of extraneous electrical disturbances is eliminated.

4. In an apparatus for making geophysical explorations, a thermionic tube having a grid and a cathode, an impedance connecting the grid and cathode and means for impressing a negative potential at an intermediate point in said impedance the construction being such that the effect of extraneous electrical disturbances is eliminated.

5. In a seismograph system having a seismophone, a thermonic tube containing a grid, a plate and a cathode, a source of plate potential for said tube, an amplification channel, a conductor connecting the seismophone to said grid, a conductor connecting said seismophone to said cathode, means for impressing the output of said thermionic tube upon said amplification channel, and means operated by the output of said amplification channel for recording voltage variations occurring in said seismophone, means for nullifying the effect of extraneously induced voltages in said conductors connecting the seismophone to grid and cathode of said thermionic tube including in combination an impedance interposed between grid and cathode of said tube, said impedance having a variable contact arm and means electrically coupling said contact arm to a negative point of the source of plate potential of said thermionic tube.

6. In an apparatus for making geophysical explorations, a first thermionic tube having a grid and a cathode, a pair of conductors of considerable length connected to the grid and the cathode respectively, means for producing a variable potential across said conductors, an impedance connecting the grid and cathode, an amplification channel having a second thermionic tube provided with a plate potential, a contact arm for said impedance, said contact arm being connected to the negative terminal of said plate potential, and means for impressing the output of said first thermionic tube upon said amplification channel and recording means operated by the output of said amplification channel.

KENNETH C. WOODYARD.
CLIFFORD A. PUTNAM.
HAROLD R. PRESCOTT.